Figure 2:
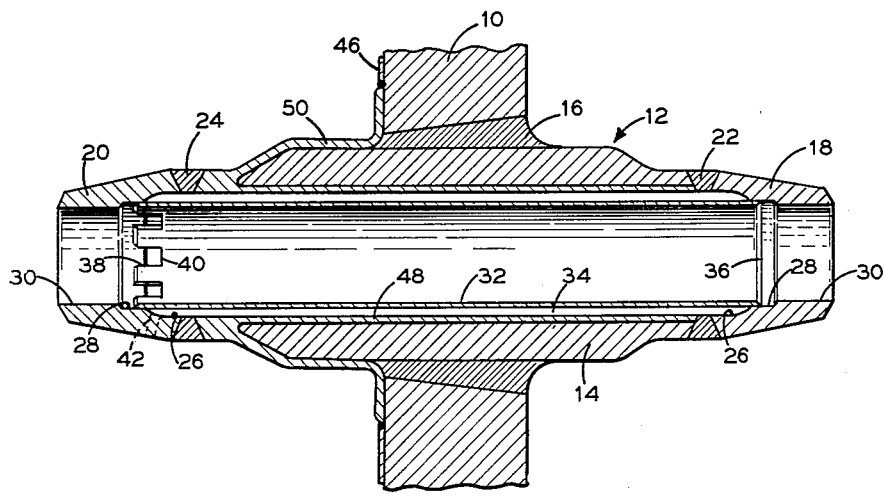

Oct. 6, 1964   D. A. SHROCK ETAL   3,151,890
THERMAL INSULATED NOZZLE STRUCTURE
Filed April 24, 1961

INVENTORS
James O. Wilson
Dallas A. Shrock
BY
ATTORNEY

3,151,890
THERMAL INSULATED NOZZLE STRUCTURE
Dallas A. Shrock and James O. Wilson, Barberton, Ohio, assignors to The Babcock & Wilcox Company, New York, N.Y., a corporation of New Jersey
Filed Apr. 24, 1961, Ser. No. 104,867
3 Claims. (Cl. 285—47)

This invention relates to a nozzle structure for pressure vessels and more particularly to a nozzle for attachment to and penetration through a drum used in fluid heat exchange apparatus, such as vapor generators, operating at high temperatures and high pressures. In such generators design considerations usually dictate a pressure vessel which must have thick walls to properly withstand stresses imposed due to the operating pressure. When the nozzle of such a pressure vessel receives a pressurized fluid of substantially different temperature than the main body of fluid within the pressure vessel, the resulting temperature differential frequently induces damaging stresses in the vessel metal adjacent the connection. When such conditions are cyclically repeated or long continued, stress cracks appear in the vessel metal, weakening the vessel and necessitating extensive repairs. Such results are often aggravated when the fluid also has a corrosive effect upon the vessel metal.

In pressure vessels of the character referred to, for instance, for operation at pressures above 600 pounds per square inch, the walls of the vessel are of comparatively high tensile strength metal and of substantial thickness, even when of moderate diameter. Tubes or nozzle connections are required to supply fluid to, or withdraw it from, such pressure vessels in service, and the fluid flowing through such connections may have a substantially lower or higher temperature than that contained in the pressure vessel.

The average temperature of the metal shell of a pressure vessel approaches the temperature of the fluid contained therein, especially when there is external insulation, and the temperature of the metal of the tube or pipe conveying fluid to, through, or from the vessel is approximately that of the fluid flowing in it, or very nearly so. The connecting tube or nozzle and the vessel wall are in contact at their juncture to provide a pressure-tight joint, which in modern high pressure apparatus is a welded joint. Frequently the construction is such that the metal of the tube extends wholly through the hole in the vessel wall.

When the fluid flowing in the nozzle has a temperature different from that of the fluid in the vessel, the tube metal in contact with the flowing fluid will have a a different temperature than the metal of the vessel wall, the coefficients of thermal expansion of the metals will be different and the metal of higher temperature metal will have expanded more than the metal of lower temperature. This relative expansion can adversely affect on the joint between the two metal parts. For example, if the tube is conveying a fluid to the vessel and the flowing fluid is colder than that of the main body of fluid within the vessel, the tube metal will contract relative to that of the vessel and damage to the joint may result. In such a joint there will be a flow of heat from the hotter metal of the vessel wall to the colder metal of the tube in contact with it, so that the metal of the tube at this zone will not be as cold as the fluid flowing within it.

In addition to the adverse effect on joints between tube and vessel arising from different fluid temperatures, there is another adverse condition present where the metallic parts are subjected to sudden or cyclic temperature changes which may induce excessive stresses in the metal that may cause a crack or rupture. An example of such a condition arises when the temperature of the fluid entering the vessel is substantially different than the temperature of the fluid in the vessel so that there is a temperature gradient set up with the heat flux through the metal of the vessel wall around the tube hole radially away from the hole, if the temperature of the entering fluid is the higher, or toward it if the temperature of the entering fluid is the lower. When the metal of the vessel wall is colder at the hole than at a distance from it, the metal at the hole is contracted relative to that at a distance, and thus a tension stress is set up which is more severe the greater the radial temperature gradient, that is, the greater the temperature difference per inch measured along the thermal path. Such a tension stress may exceed the elastic limit of the metal and cause it to fail. With the reverse temperature relationships, a higher temperature in the fluid flowing will cause the metal of the vessel wall to expand at the hole relative to the metal at a distance, and a crushing stress will be set up, which may exceed the elastic limit of the metal and thereby cause it to fail.

Most joints between the metal of the tube and that of the vessel wall are of the metallically integral type produced by fusion welding. Relative expansion of the two metals thus joined may result in an excessive stress in the junction metal and cause the joint to fail, independent of damage to the metal of the vessel wall or to the tube.

Heretofore, such difficulties have been satisfactorily taken care of by the use of thermal sleeves, various types of which are well known in the art. However, the advent of nuclear energy has introduced problems hitherto unknown in this field. When such conditions as described above are encountered, wherein the fluids involved are radioactive, or are bearing radioactive particles, thermal sleeves of the prior art have incorporated one or more features which made them undesirable for application to systems involving such radioactive fluids. These undesirable features include unflushed crevices and undrained portions in which the radioactive fluid or particles may collect and become dangerous either as a result of the radiation emitted or from the corrosion produced thereby. A further undesirable characteristic of previous thermal sleeves has been the utilization of welds in the fabrication of the sleeves, which if they failed, would permit the thermal sleeve to move relative to the nozzle and thus cease to protect the junction involved. Such construction would be particularly undesirable due to the dangers involved in the containment of the radioactive fluid. It is thus the purpose of the present invention to provide a nonwelded thermal sleeve which cannot fail in service and which yet provides a crevice-free, drainable assembly.

Accordingly, the present invention provides a nozzle with thermal sleeve for a pressure vessel comprising a nozzle passing through an integral with the pressure vessel wall and having inlet and outlet ends of reduced internal diameter, and an internal sleeve within said nozzle extending from one end to the other end to provide an annular chamber within and extending the length of the nozzle.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
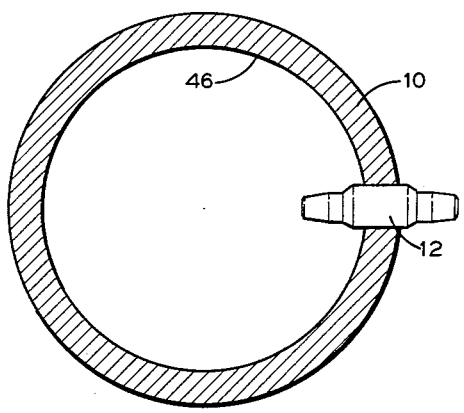

Of the drawings:

FIG. 1 is a cross section of a pressure vessel in which the present invention is utilized; and FIG. 2 is an enlarged cross sectional detail of the thermal sleeved nozzle of the present invention.

In a pressure vessel having a circular cross section as shown in FIG. 1, the pressure vessel wall 10 is penetrated by a connection 12 carrying fluid to, through, or from the interior of the vessel. When the connection 12 is made to a system carrying a fluid of substantially different temperature than the main body of fluid within the pressure vessel, such connection preferably incorporates a thermal sleeve arrangement.

The thermal sleeved nozzle of the present invention is illustrated in FIG. 2 which shows a cross section of the connection 12 passing through the pressure vessel wall 10. The connection comprises a tubular nozzle 14 having a larger inner diameter than that of the line (not shown) to which it connects. This nozzle passes through an opening provided in the pressure vessel wall and is integrally attached thereto by weld 16. The length of this nozzle, and the distance it extends beyond the pressure vessel wall, is dictated by the temperature differential to be accommodated and may be computed by one skilled in the art. Fluid inlet and outlet ends, 18 and 20 respectively, are integrally attached by welds 22 and 24 to the ends of the nozzle 14. These ends have three distinct internal diameters, corresponding to the internal surfaces designated as 26, 28 and 30 respectively. The largest inside diameter is substantially equal to the internal diameter of the nozzle 14 and the smallest inside diameter at the extremity of the ends 18 and 20 is substantially equal to the internal diameter of the connecting line. The relationship of these diameters to the diameter corresponding to surface 28 intermediate of those previously described will be further discussed hereinbelow.

An internal sleeve 32 having an internal diameter substantialy the same as that of the connecting line extends within the nozzle 14 from the inlet end 18 to the outlet end 20 forming an annular chamber 34 between the internal sleeve and the nozzle. It is this annular space which provides a reservoir of the fluid which is flowing through the connection, providing thermal buffering to reduce the thermal stresses at the vessel joint. The internal sleeve has a wall thickness sufficient to provide the requisite structural rigidity. It need not be designed to withstand the pressure imposed on the system since the nozzle 14 serves this function and there is a comparatively small pressure difference between the pressure acting on the inside of the internal sleeve and that prevailing in the annular chamber 34. The internal diameter 28 of the inlet and outlet ends, 18 and 20 respectively, is substantially equal to the external diameter of the internal sleeve 32 which is seated therein. The end of the internal sleeve which is located in the inlet end 18 is a forced or shrunk fit, as at 36, within the internal surface 28 while the opposite, or outlet, end 20 is provided with a sliding fit 38 between the internal sleeve and the internal surface 28 so as to provide for differential expansion between the internal sleeve 32 and the nozzle 14 while at the same time precisely and positively positioning the internal sleeve within the nozzle so that it will be retained in the same relative position with respect to the nozzle at all times. The end of the internal sleeve having the sliding fit within the outlet end 20 is provided with a plurality of notches 40 which provide a means whereby the annular chamber 34 may be drained. It is to be understood that the terms inlet and outlet, as referring to the ends 18 and 20, are used primarily as a means of reference and do not, necessarily, refer to the direction of fluid flow through the nozzle. Where the nozzle connection through the pressure vessel is horizontal and the fluid within the vessel is the same as that flowing through the connection, a drain may be provided, as shown in phantom at 42, through the end piece 20.

In some applications of such a connection as herein disclosed, the fluid involved is highly corrosive and must be contained within a corrosion resistant system. Such a system may be made of stainless steel alloys, but due to their high cost and difficulty of fabrication, it is customary to provide a pressure vessel of ordinary carbon steel having an inner cladding of stainless steel on those portions subjected to the action of corrosion. Such cladding is shown at 46 applied to the ordinary carbon steel wall 10 of the pressure vessel. When this construction is used it is necessary that connections penetrating the clad wall be adapted to accommodate the bi-metallic junction that exists between the carbon steel and the stainless steel.

Referring again to FIG. 2 the nozzle 14 is fabricated of ordinary carbon steel and has a stainless steel lining 48. Such a nozzle, having an inner lining, may be coextruded by methods well known in the art. Thus the weld 16 between the nozzle and the pressure vessel wall is between similar metals. Furthermore, it may be that the line connected to the pressure vessel is also handling a corrosive fluid and will be fabricated of stainless steel. In this event the end pieces 18 and 20 and the internal sleeve 32 are fabricated out of stainless steel so that welds between the end pieces and the connecting lines (not shown) could also be made between similar metals. Since the end of the nozzle 14 within the pressure vessel, and thus subject to the action of the corrosive fluid, is provided with an exterior layer of cladding 50, the weld 24 between the outlet end 20 and the nozzle would also be between similar metals. Thus it may be seen that the only dissimilar weld involved in the fabrication of a bi-metallic connection as herein disclosed would be the weld 22 between the inlet end 18 and the nozzle 14.

Thus the present invention provides a thermal sleeved nozzle having a very low probability of failure. This is due to the fact that the annular chamber is completely drained, preventing any accumulation of radioactive or corrosive particles therein, and the internal sleeve is positively and permanently located without any welds therein subject to failure or undesirable stresses.

While in accordance with the provisions of the statutes we have illustrated and described herein the best forms and modes of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A thermal sleeved nozzle for a pressure vessel comprising a nozzle passing through and integral with the pressure vessel wall and having inlet and outlet ends of reduced internal diameter, an internal sleeve within said nozzle extending substantially from one end to the other end to provide an annular chamber concentric within and extending the length of said sleeve, said internal sleeve having an internal diameter substantially equal to that of said nozzle ends to provide a substantially smooth flow path through said nozzle, said internal sleeve having an external diameter larger than the internal diameter of said inlet and outlet ends to retain said internal sleeve within said nozzle, said internal sleeve being secured in one end of said nozzle and slidably received in the opposite end of said nozzle to accommodate differential expansion between said internal sleeve and said nozzle.

2. A thermal sleeved nozzle as claimed in claim 1 wherein said secured end of said sleeve has an interference fit within said end of said nozzle.

3. A thermal sleeved nozzle as claimed in claim 1 wherein said secured end of said sleeve is disposed at the inlet end of said nozzle, an means is provided at the outlet end of said nozzle to drain said annular chamber.

References Cited in the file of this patent

UNITED STATES PATENTS

| | | |
|---|---|---|
| 1,389,768 | McFarland | Sept. 6, 1921 |
| 1,802,766 | Kerr | Apr. 28, 1931 |
| 2,136,474 | Straty | Nov. 15, 1938 |
| 2,252,069 | Fletcher | Aug. 12, 1941 |
| 2,306,612 | Buehner | Dec. 29, 1942 |
| 2,497,986 | Goode | Feb. 21, 1950 |
| 2,772,848 | Holzer et al. | Dec. 4, 1956 |
| 2,788,994 | Vande Wateren | Apr. 16, 1957 |